B. M. BERNTSON.
FLUE SCRAPER.
APPLICATION FILED APR. 24, 1919.
1,336,673. Patented Apr. 13, 1920.
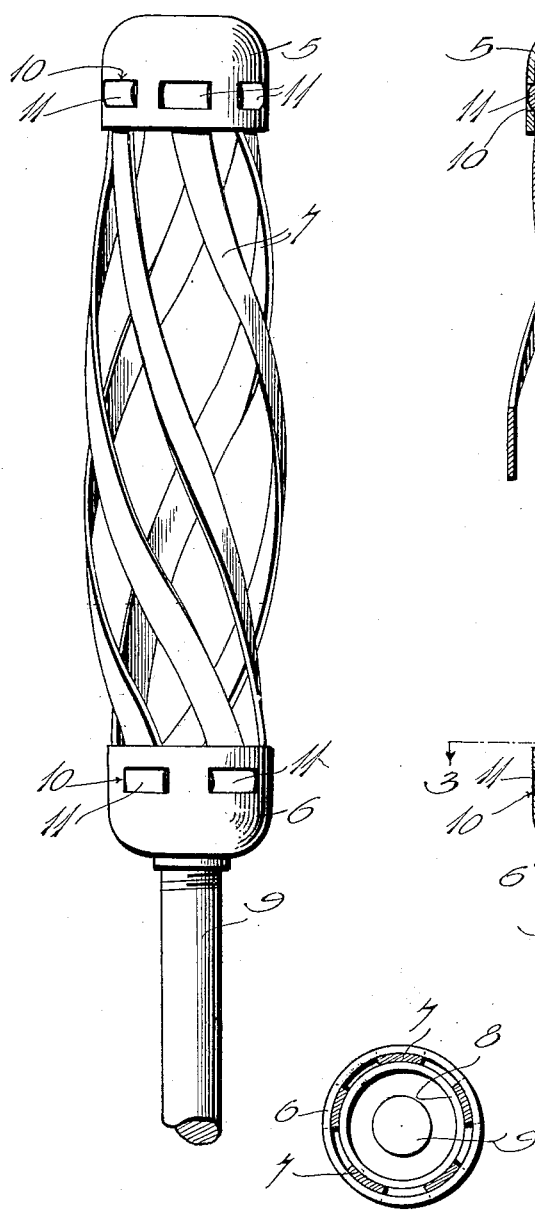
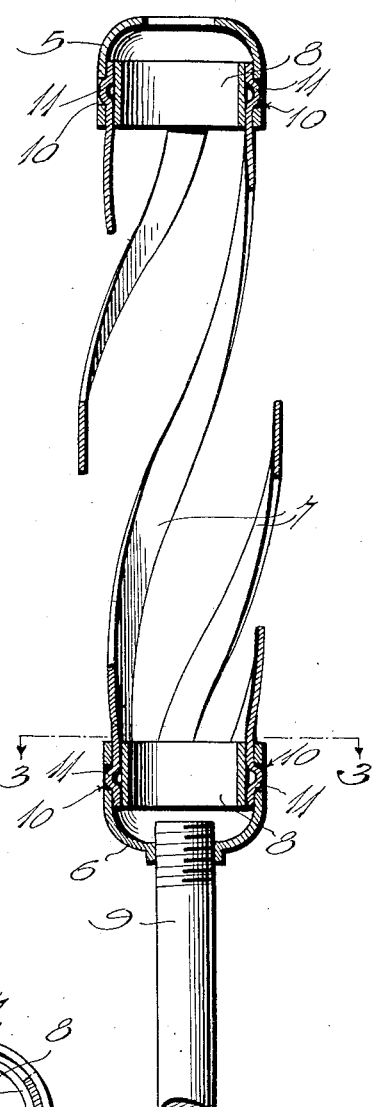
Inventor
B. M. BERNTSON

UNITED STATES PATENT OFFICE.

BERNHARD M. BERNTSON, OF CHICAGO, ILLINOIS.

FLUE-SCRAPER.

1,336,673.   Specification of Letters Patent.   Patented Apr. 13, 1920.

Application filed April 24, 1919. Serial No. 292,341.

*To all whom it may concern:*

Be it known that I, BERNHARD M. BERNTSON, a citizen of the United States, residing at Chicago, in the county of Cook and State of Illinois, have invented certain new and useful Improvements in Flue-Scrapers; and I do declare the following to be a full, clear, and exact description of the invention, such as will enable others skilled in the art to which it appertains to make and use the same.

This invention relates to flue scrapers.

One object of the invention is to simplify and improve upon devices of this character by providing an extremely simple, strong and durable connection between the scraper heads and the blades.

Another object is to provide a device of this character that can be very quickly, easily and conveniently assembled, and which permits the scraper-blades to be easily removed and replaced by first removing two securing members which hold all the scraper-blades in place.

Other objects and advantages may become apparent to persons who read the following details of description in connection with the accompanying drawings, in which:—

Figure 1 is a side elevation illustrating my invention.

Fig. 2 is a longitudinal central sectional view of the same.

Fig. 3 is a transverse sectional view, the section being taken along the line 3—3 of Fig. 2.

Referring to these drawings in detail, in which similar reference characters correspond with similar parts throughout the several views, the device consists of scraper heads 5 and 6, a plurality of scraper blades 7 and two rings or securing members 8.

The scraper heads 5 and 6 are of counterpart construction except that the latter is provided with internal screw threads for connection with a shaft or handle member 9, and therefore, a further description of the end of the scraper to which the member 9 is attached will suffice for the other end of the scraper. Each scraper head is formed with an annular or endless series of quadrangular openings or recesses 10, and each of these openings or hollow seats receives a protuberance or corrugation 11 which is formed adjacent to an end of a strip 7, that is, each of the strips 7 is formed with two protuberances of corrugations 11 which extend transversely or laterally across its end portions at a slight distance from its extreme ends. These elements 11 are of a size and shape to fit snugly in the inner portion of the seats 10 while portions of each strip, on opposite sides of each protuberance 11, lie against the interior surface of the contiguous hollow scraper head. One of the rings or securing members 8 coöperates with a corresponding one of the scraper heads for clamping these corrugated end portions and holding their respective corrugations in the respective apertures or seats 10; that is, the rings 8 are of cylindrical form, in the present instance, and the inner end of each scraper head is also of cylindrical form. In other words, the shape and cross sectional area of the inner end of each ring 8 is the same as the shape and cross sectional area of its outer end, and the same is true of each scraper head from the contiguous end of each blade 7 to its own inner end. Therefore, whether the scraper heads be cylindrical or prismatic, the same general principle applies, that is, there is no wedging action of the rings 8 when they are being pressed into the position shown in Fig. 2, but the rings 8 are of such a size that a considerable amount of force is required to overcome the frictional contact thereof with the inner surfaces of the strips 7 which forms a seat of equal cross section at its opposite ends. Therefore, this frictional contact of the rings or securing members 8 with the strips 7 insures a secure and permanent engagement of the rings in their respective useful positions without the necessity of any auxiliary securing means. Each ring 8 bridges the groove opposite the corrugation 11 of each strip end, so that the inner surfaces on opposite sides of this groove combine with the contiguous outer surface of the ring 8 to provide the necessary frictional engagement for securing the ring 8 in position, and this frictional engagement also prevents the contiguous corrugation from straightening out and becoming of noneffect.

From the foregoing description, it will be seen that I have invented a very simple device which may be manufactured at a very moderate cost, and which is very durable and efficient.

Although I have described this embodiment of my invention very specifically, my invention is not limited to these exact details of description and combination of parts, but I am entitled to make changes within the scope of the inventive idea disclosed in the foregoing description and following claims.

What I claim as my invention is:—

1. In a flue scraper, a plurality of strips each having a protuberance, a scraper-head having a plurality of recesses, and a securing member separate from said scraper-head and movable into and out of its securing position, the protuberances of said strips being seated respectively in said recesses while the contiguous parts of said strips lie against said scraper head, said securing member being removably seated against the opposite sides of said strips from their protuberances and coacting with said scraper head to clamp the strips and hold their protuberances in said recesses.

2. In a flue scraper, a plurality of scraping strips each having a corrugation extending thereacross adjacent to an end thereof, a scraper-head including a hollow cylindrical portion formed with an endless circular series of slots in open communication with its interior, and a hollow cylindrical sleeve constituting a securing ring for said strips, said strips having their corrugations fitted respectively in said slots, the inner surfaces of said strips forming a seat of substantially equal cross section at its opposite ends, said securing ring having its circular outer surface tightly fitted against the inner surfaces of said seat formed by the strips within said hollow scraper head, whereby said ring and scraper head secure said strips in place independently of any extraneous securing means.

In testimony whereof I have hereunto set my hand.

BERNHARD M. BERNTSON.

Witnesses:
GEORGE P. PHILLIP,
ALBERT R. GAGEL.